United States Patent [19]

Yamazaki et al.

[11] 3,832,590
[45] Aug. 27, 1974

[54] HIGH PRESSURE METAL-VAPOR DISCHARGE LAMP HAVING ALUMINA TUBE WITH THICKENED END PORTIONS SEALED BY ALUMINA DISKS

[75] Inventors: Haruo Yamazaki, Moriyama; Hidezo Akutsu, Ashiya; Takio Okamoto, Osaka, all of Japan

[73] Assignee: Matsushita Electronics Corporation, Kadama, Osaka Pref., Japan

[22] Filed: Mar. 2, 1973

[21] Appl. No.: 337,474

[30] Foreign Application Priority Data
Mar. 8, 1972 Japan.................. 47-25342

[52] U.S. Cl............... 313/218, 313/220, 313/221, 313/229, 313/253, 313/286, 313/289
[51] Int. Cl............ H01j 61/30, H01j 61/36
[58] Field of Search ........... 313/217, 218, 220, 221, 313/225, 227–229, 252, 253, 256, 286, 288, 289

[56] References Cited
UNITED STATES PATENTS
3,219,869 11/1965 Schmidt.................... 313/229 X
3,363,134 1/1968 Johnson.................... 313/227 X
3,564,328 2/1971 Bagley et al................ 313/220
3,716,743 2/1973 Mizuno et al............... 313/220

Primary Examiner—Herman Karl Saalbach
Assistant Examiner—Siegfried H. Grimm
Attorney, Agent, or Firm—Wenderoth, Lind & Ponack

[57] ABSTRACT

A high-pressure metal-vapor discharge tube having improved characteristics is disclosed. The tube has an alumina hollow discharge enclosure tube member, the ends of which are sealed by alumina end disks. The end disks have central apertures through which electrode lead in wires or rods extend into the discharge enclosure. The lead in wires or rods are made of a material which is resistant to the corrosive effects of metal halide. The hollow discharge enclosure tube member has walls which are thicker at the two ends than in the intermediate region of the tube member. Preferably, the ends are more than twice as thick as the central walls. This results in a stronger seal between the alumina end disks and the tube member, thus not only avoiding the risk of breakage when sealing the tube member and manufacturing defects such as a defective seal, but also ensuring longer life of the lamp.

6 Claims, 7 Drawing Figures

PATENTED AUG 27 1974　　　　　　　　　　　3,832,590

HIGH PRESSURE METAL-VAPOR DISCHARGE LAMP HAVING ALUMINA TUBE WITH THICKENED END PORTIONS SEALED BY ALUMINA DISKS

BACKGROUND OF THE INVENTION

This invention relates to a high-pressure metal-vapor discharge tube constructed of alumina, and concerns in particular the construction of its discharge tube enclosure.

Recently, high-pressure discharge tubes using metal halide have come into practical use. In this kind of tubes, quartz glass has been widely used for the discharge tube enclosure. However, the quartz glass is liable to cause recrystalization during the operation of the lamp and to result in the so-called devitrification phenomenon. This devitrification phenomenon inevitably attenuates the light flux of the lamp.

Especially in the case where the high-pressure metal-vapor discharge tube contains a metal halide in the quartz tube, the recrystalization of the quartz-glass enclosure of the discharge tube is apt to occur sooner and to result in greater attenuation of light flux.

Moreover, sodium metals enclosed in the tube may also react with the quartz glass and quicken the recrystalization. Hence, when employing the quartz glass as the discharge tube enclosure, material the kinds or the quantities of metal halide that could be added have inevitably been limited.

While coping with such problems, a translucent alumina tube enclosure has been developed as a material of discharge tubes, and high-pressure sodium-vapor discharge tubes are already in practical use. When the translucent alumina tube enclosure is used in the high-pressure metal-vapor discharge lamp, it proves to be chemically stable without causing the devitrification phenomenon, unlike the case with quartz glass, and hence, a lamp employing translucent alumina displays an excellent light flux stability in its performance. Furthermore, since its resistance to high temperature is much higher than that of the quartz glass, there is virtually no fear of the discharge tube breaking when operative at high temperature.

Nevertheless, when using a translucent alumina tube enclosure for the discharge tube, there has been a great problem relating to the sealing parts of the discharge tube. That is, for sealing the ends of the discharge tube enclosure, either metal end caps or sealing metal tubes have been employed, and therefore, the sealing parts of these metals that extrude inside the discharge tube have been gradually corroded by gas, for instance, halogen which is confined in the tube and causes leaking. Therefore, in manufacturing a practical tube, the construction of discharge tube enclosure, especially the sealing construction of tube ends, is a vital point for the discharge tube.

The above aspect will be explained in detail in the following, referring to, for instance, the conventional sodium lamp shown in FIG. 1 having metal end caps 1 made of niobium etc. and a metal tube 2, both positioned inside an alumina discharge tube enclosure 3. If such a tube contains halide in its discharge tube enclosure 3, the metal end caps 1 and the metal tubes 2 are liable to be corroded during the operation of the tube and to result in leakage, rendering it unsuitable for practical uses.

SUMMARY OF THE INVENTION

This invention provides a high-pressure metal-vapor discharge tube of translucent alumina having stable gas-sealing characteristics, as well as halide-resistant characteristics enabling the attainment of high color and rendition and high efficiency.

DETAILED DESCRIPTION OF THE INVENTION

Figure 1:
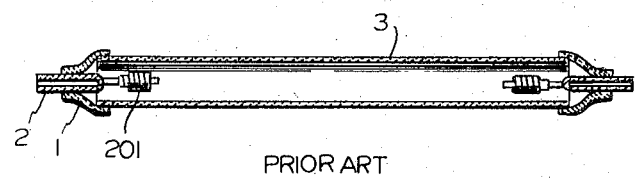
FIG. 1 is a sectional side view of a high-pressure metal-vapor discharge tube of the prior art.

In this invention, the tubular enclosure of the discharge tube comprises an alumina tube having a pair of alumina end discs bonded to the ends of said tube, wherein the thickness of the end wall portions of the tube is greater than that of the inbetween part.

For optimum reliability, the ends of the tube should be more than twice as thick as the intermediate portion, in order to avoid cracking of the end parts by different thermal expansion between the end parts and the end discs.

The abovementioned tube is suitable for containing metal halides. As the enclosed substance, aluminum halide or a metal halide which has more affinity than aluminum with halogen is used. Such halide is selected from the metal halides of the alkali group, the titanium group, the niobium group, the rare-earth group and the actinoid group. If a metal halide of less affinity than aluminum with halogen, for instance, a halide of indium or thallium is used, such halide is reduced by the aluminum evaporated from the alumina enclosure during burning, thereby producing a free metal of low vapor pressure and aluminum halide. This change results in a decrease of the spectral emission of said metal and an increase of that of the aluminum halide, and hence results in an undesirable change in the color of radiation during the burning.

According to experimental research made by the inventors, in the discharge tube of the present invention, only molybdenum or tungsten can be employed as the metal exposed to the confined metal halides. Therefore, the discharge tube has lead-in electrode holding wires or rods of tungsten or molybdenum which pass through the end discs of the tubular enclosure.

Though it is known to construct a high-pressure metal-vapor discharge tube by sealing both ends of a tubular translucent alumina enclosure with a pair of translucent alumina end discs, it has been found through experimental tests by the present inventors that such translucent end discs may easily crack. Such crackings of the end discs can be eliminated by adopting opaque alumina end disc as well as electrode-holding wires of a diameter of less than 2 mm. However, when such opaque alumina end discs are used, the ends of the translucent alumina tube almost always crack at the bonded portions. Through experimental study, the inventors have found that such cracks can be avoided by providing thick wall portions at both ends of the transparent alumina tube. Accordingly, the end discs should be of opaque alumina and the electrode-holding wires are preferably of less than 2 mm diameter, and moreover, both end parts of the alumina tube should be thicker than the intermediate section.

According to the experiments, for alumina tubes having various ratios of $t_2/t_1$, wherein $t_1$ is the wall thickness of the intermediate part of the tube and $t_2$ is the wall thickness of the end parts, the percentage of damage to the tube by cracking at the tube ends after burnings for 2,000 hours are as follows:

| $t_2/t_1$ | 1.0 | 1.5 | 2.0 | 3.0 |
|---|---|---|---|---|
| percentage | 100% | 60% | 0% | 0% |

A preferred example is explained as follows referring to the attached drawings.

Figure 2:
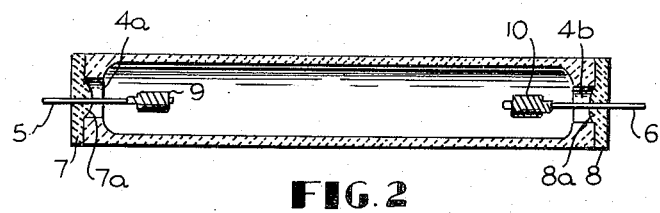
FIG. 2 is a sectional side view of a high-pressure metal-vapor discharge tube embodying the present invention.

An alumina tube enclosure 4 is shown in FIG. 2. Translucent polycrystalline alumina ceramic can be used therefor and monocrystalline alumina ceramic can be also used. As shown in the enlarged partial sectional-side view in FIG. 3, each end of the enclosure has a thickness $t_2$ which is greater than the thickness $t_1$ of the inbetween part so as to provide a sufficient bonding face area and hence produce strong bonding. The optimum result is obtained under the condition that:

$$t_2 \geq 2t_1.$$

Both ends of the tubular enclosure 4 are sealed by end discs 7 and 8 which are made of alumina and through which lead-in wires or rods 5 and 6, are respectively inserted. In order to avoid corrosion of the wires by the materials contained within the tube, the wires should be of tungsten or molybdenum. The discs are not required to be translucent, and should, in fact, be opaque. Such opaque ceramic has a modulus of rupture as high as 3,000 to 3,500 kg/cm$^2$, which is far higher than the 2,000 to 2,500 kg/cm$^2$ modulus of translucent alumina. Gas-tight bonding of the discs 7, 8 to the tube ends is made by employing a halogen-resistant cement comprising Al$_2$O$_3$, SiO$_2$, B$_2$O$_3$ and BeO.

Discs 7 and 8 have protrusions 7a and 8a for disc centering, respectively, on the inner faces as shown in FIG. 2, so that by inserting the protrusions 7a and 8a into the openings 4a and 4b on both ends of the enclosure 4, the centers of the discs 7 and 8 can be positioned exactly on the axis of the enclosure 4. By designing the diameter of the protrusions at their bases and the diameters of the openings to be the same, it is very easy in a mass production process to precisely position the discs, thereby preventing the centers of the discs from missing the axis of the enclosure.

Such exact positioning and fixing ensures high productivity in manufacturing.

In order to avoid cracking of the end discs 7 and 8 in the vicinity of the central aperture through which the wire passes during thermal transient periods such as when switching-on or switching-off the device, due to the difference of the thermal expansion coefficient between the alumina and the molybdenum or tungsten wires, the diameter of the lead-in wires 5 and 6 should be less than 2mm. These lead-in wires 5 and 6 hold known coiled discharge electrodes 9 and 10.

In the discharge enclosure 4, xenon, argon, neon or a neon-argon mixed gas is confined at a pressure of about 20 Torr, as a starting gas, and mercury is contained as a buffer gas. In addition, 5 to 10 mg of mercury iodide as well as a small amount of metal or metals selected from the group consisting of aluminum, titanium, scandium, dysprosium or thorium are included as additives in the enclosure 4. A small amount of sodium halide may be added in addition to the additives.

The above-described discharge tube 4 is sealed by sintering with cement, and is then fixed in a known outer vacuum bulb (not shown in the drawing) to complete a high-pressure metal-vapor discharge lamp.

Figure 4:
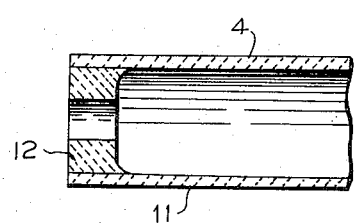

FIG. 4 shows a modified example of an end part of the enclosure tube, wherein a pre-formed alumina ring 12 is fit into the opening at each end of a plain (Prior Art) tube 4 of translucent alumina by sintering the rings 12 and the tube 4 together at a high temperature, so the end parts of the enclosure have greater thickness than the inbetween part.

Figure 5:
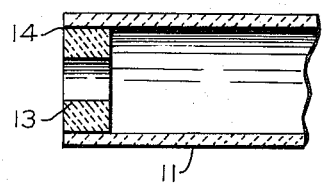

FIG. 5 shows another modified example of an end part of the enclosure tube, wherein a pre-fabricated alumina ring 13 is bonded in the opening at each end of a plain tube 4 of translucent alumina by employing a cement layer 14 having halogen-resistant characteristics.

Figure 6:
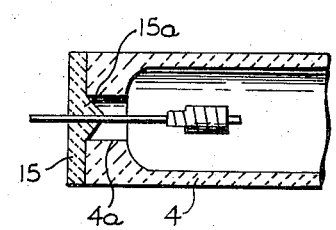
FIG. 6 and FIG. 7 are enlarged sectional partial side views of the modified examples of the tubular enclosure of the present invention.

FIG. 6 shows an example of the discharge tube having a modified end disc 15, wherein the centering protrusion 15a of the alumina end disc 15 is cone shaped.

Figure 7:
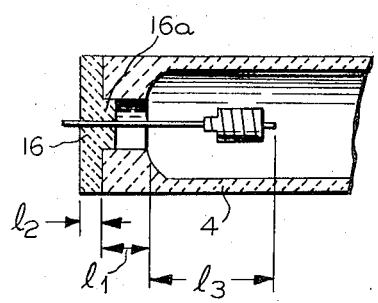

FIG. 7 shows another example of the discharge tube with a modified end disc 16, wherein centering protrusion 16a of the alumina end disc 15 has a short cylindrical shape.

The protrusion 7a, 15a or 16a of disc 7, 15 or 16, respectively makes the disc thicker in the region adjacent the wire aperture, and hence, functions to strengthen the disc against cracking during thermal transient periods.

Figure 3:
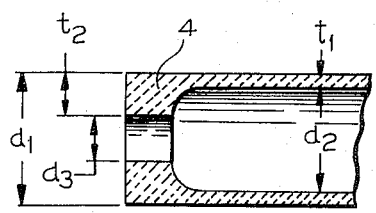
FIG. 3 to FIG. 5 are enlarged sectional partial side views of the tubular enclosure embodying the present invention.

Next, one example of the discharge tube is described as follows:

The discharge tube enclosure 4 is made as shown in FIG. 3, wherein:
outer diameter . . . $d_1 = 18$mm
inner diameter . . . $d_2 = 16$mm
diameter of end opening . . . $d_3 = 6$mm
thickness of inbetween part . . . $t_1 = 1$mm
thickness of end face part . . . $t_2 = 6$mm.

The abovementioned discharge tube enclosure 4 is then sealed by the end disc 16 as shown in FIG. 7 to complete a discharge tube wherein:
length of the thick part . . . $l_1 = 3.0$mm
thickness of the end disc . . . $l_2 = 2.0$mm
length from the inner tip of the electrode-holding wire to the inner end of the thick part . . . $l_3 = 10.0$mm
distance between the opposing inner tips of the electrodes . . . 50mm
diameter of the electrode-holding lead-in wire . . . 0.9mm The mixed gas confined in the tubular enclosure consists of 99.5 percent of neon and 0.5 percent of argon and has a pressure of about 20 Torr. at room temperature.

The additives confined in the enclosure are:
Sc . . . 10mg
HgI$_2$ . . . 10mg
NaI . . . 20mg
Hg . . . 50mg.

The discharge lamp as mentioned above radiates a spectrum evenly distributed throughout the full range of visible rays, enjoining a general color rendering index of 80 to 90 and an efficiency of 55 to 70 lumen/-watt.

The above mentioned invention is also applicable to other lamps containing additives other than a metal halide.

As is described above, the discharge lamp of the present invention has a constitution wherein the tubular enclosure has greater thickness at both ends than in its intermediate section and accordingly, the end faces to which the end discs are bonded, have wider sealing areas than conventional simple-shaped (plain) tubular enclosures. Therefore, the discharge tube has sufficient strength to be able to resist cracking of the end parts of the alumina tube which can also result in gas leakage therethrough.

Since tungsten or molybdenum is used in electrode-holding wires (rods), the wires are not corroded by the confined halogen compound, thereby assuring the long life of the tube.

Moreover, since the diameter of the electrode-holding wires is selected to be less than 2mm, cracking of the end discs due to thermal expansion is virtually eliminated. Furthermore, since the end discs have protrusions to be inserted in the end openings of the tubular enclosure, undesirable off-center bonding of the end discs is precluded. Thus production efficiency in manufacturing the tubes can be greatly increased.

What is claimed is:

1. In a high pressure metal vapor discharge tube including a sealed tubular enclosure constructed of alumina, a pair of electrodes, one of said pair of electrodes disposed adjacent each end of said tubular enclosure, mercury and at least one metal halide being vaporized in operation of said discharge tube, the improvement which comprises:

said alumina tubular enclosure having a wall thickness at the ends thereof greater than the wall thickness of the intermediate portion of said tubular enclosure, and a pair of alumina end disks bonded to the respective ends of said tubular enclosure for sealing thereof, said end disks having a higher modulus of rupture than said tubular enclosure and said end disks each having an aperture therein, and a wire selected from the group consisting of tungsten and molybdenum extending through each aperture and coupled to said electrodes for holding said electrodes in position.

2. The improved high pressure metal vapor discharge tube of claim 1 wherein the wall thickness of said alumina tubular enclosure at the ends thereof is greater than twice the wall thickness of the intermediate portion of the tubular enclosure.

3. The improved high pressure metal vapor discharge tube of claim 1 wherein said wire extending through each aperture has a diameter of less than 2 mm.

4. The improved high pressure metal vapor discharge tube of claim 1 wherein said alumina end disks are constructed of opaque alumina.

5. The improved high pressure metal vapor discharge tube of claim 1 wherein each of said alumina end disks has a protrusion extending from one surface thereof, said protrusion being a centering guide and being fit in respective end openings of said tubular enclosure.

6. The improved high pressure metal vapor discharge tube of claim 1 wherein said at least one metal halide is a halide of a metal selected from the group consisting of the alkali metals, aluminum, the titanium group, the niobium group, the rare earth metal group and the actinoid group.

* * * * *